US010833991B2

(12) United States Patent
Nguyen et al.

(10) Patent No.: US 10,833,991 B2
(45) Date of Patent: Nov. 10, 2020

(54) PARTIAL SOURCE ROUTING FOR CROSS-NETWORK ROUTING

(71) Applicant: Itron, Inc., Liberty Lake, WA (US)

(72) Inventors: Viet-Hung Nguyen, Saint-Mande (FR); Jerome Bartier, Edinburgh (GB); James Laurence Taylor, Sherborne (GB)

(73) Assignee: Itron, Inc., Liberty Lake, WA (US)

( * ) Notice: Subject to any disclaimer, the term of this patent is extended or adjusted under 35 U.S.C. 154(b) by 57 days.

(21) Appl. No.: 16/143,149

(22) Filed: Sep. 26, 2018

(65) Prior Publication Data
US 2020/0099616 A1 Mar. 26, 2020

(51) Int. Cl.
  H04L 12/28 (2006.01)
  H04L 12/745 (2013.01)
  H04L 12/66 (2006.01)
  H04L 29/12 (2006.01)
  H04L 29/06 (2006.01)

(52) U.S. Cl.
  CPC ............ H04L 45/748 (2013.01); H04L 12/66 (2013.01); H04L 61/6059 (2013.01); H04L 69/22 (2013.01)

(58) Field of Classification Search
  None
  See application file for complete search history.

(56) References Cited

U.S. PATENT DOCUMENTS

| | | | |
|---|---|---|---|
| 2012/0287932 A1 | 11/2012 | Haddad et al. | |
| 2012/0327937 A1* | 12/2012 | Melman | H04L 69/18 370/392 |
| 2013/0163425 A1* | 6/2013 | Hughes | H04W 76/40 370/235 |
| 2013/0286846 A1* | 10/2013 | Atlas | H04L 45/34 370/236 |
| 2013/0315257 A1* | 11/2013 | Welin | H04L 45/12 370/401 |
| 2016/0150459 A1* | 5/2016 | Patil | H04W 40/02 370/328 |
| 2016/0191310 A1* | 6/2016 | Brandwine | H04L 41/0806 709/220 |
| 2017/0237649 A1* | 8/2017 | Sampath | H04L 45/48 370/238 |
| 2017/0366454 A1 | 12/2017 | Liu | |
| 2018/0013679 A1 | 1/2018 | Zhang | |
| 2018/0302321 A1* | 10/2018 | Manthiramoorthy | H04L 12/4633 |

OTHER PUBLICATIONS

The PCT Search Report and Written Opinion dated Nov. 27, 2019 for PCT Application No. PCT/us2019/053010, 14 pages.

* cited by examiner

Primary Examiner — Phirin Sam
(74) Attorney, Agent, or Firm — Lee & Hayes, P.C.

(57) ABSTRACT

Source routing techniques include sending data across several networks, while limiting source routing overhead. For example, the source routing techniques may use a first address format to route data to nodes along a routing path that are within a first network where a source node is located, and use a second address format to route the data to a node along the routing path that is within a second, different network. The node in the second network may similarly route the data through the second network using the first address format for nodes within the second network and, if needed, route the data to a node within a third network using the second address format. This may be repeated for any number of networks to reach a destination.

20 Claims, 6 Drawing Sheets

PARTIAL SOURCE ROUTING FOR CROSS-NETWORK ROUTING

BACKGROUND

Source routing techniques are often used to route communications through a network. For example, a node may send a packet to a destination in a network and specify a route that the packet takes through the network in a header of the packet. In some instances, however, a packet may traverse many nodes and/or several networks, resulting in an extensive amount of routing data in the header of the packet. For example, routing data may include a 16-byte address for each node that is located along a route to a destination. As a result, existing source routing techniques may be associated with a relatively large amount of overhead, which may cause delays in communicating, network congestion, and/or other issues that negatively affect the performance of nodes and networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

As discussed above, existing source routing techniques may be associated with a relatively large amount of overhead. This disclosure describes, in part, source routing techniques that enable data to be sent across several networks, while limiting source routing overhead. For example, the source routing techniques may use a first address format (sometimes referred to as a "short address format") to route data to nodes along a routing path that are within a first network where a source node is located, and use a second address format (sometimes referred to as a "long address format") to route the data to a node along the routing path that is within a second, different network. The node in the second network may similarly route the data through the second network using the first address format for nodes within the second network and, if needed, route the data to a node within a third network using the second address format. This may be repeated for any number of networks to reach a destination. By doing so, the techniques may minimize overhead associated with routing data. Ultimately, this may improve data transfer, reduce network congestion, and/or otherwise improve the performance of nodes and networks.

In an example of the source routing techniques discussed herein, a source node located in a network may determine a routing path for sending data to a destination node. The routing path may include nodes from any number of networks that are needed to reach the destination node. If the routing path includes nodes from multiple networks, then the networks may be bridged (e.g., a node in one network may be configured to communicate with a node in an adjacent network). In examples, each node sends a route advertisement message to a root node of a network to which the node belongs and also to each root node of each adjacent network that the node has discovered. Route advertisement messages may be forwarded by intermediate nodes along a path to a destination root. Intermediate nodes that have direct connection to an adjacent network may also duplicate received route advertisement messages to send it to root nodes in adjacent networks. In such a way, root nodes and intermediate nodes may store route information of all received nodes and be able to use such information to determine routing paths to any destination.

In examples, the source node may determine if the destination node is within a different network than the source node. For instance, the source node may determine if an address prefix for an address of the destination node is the same as an address prefix for an address of the source node. If so, then the destination node may be in the same network as the source node. If the source node is located in the same network as the destination node, then the source node may send the data to nodes along the routing path using a short address format. In particular, the source node may generate source routing data that includes short addresses for nodes along the routing path (e.g., the addresses for the nodes along the routing path are of the short address format). The source node may then send the data with the source routing data along the routing path to reach the destination node.

However, if the source node is within a different network than the destination node, the source routing data may be formatted differently. For example, the source node may identify a first node along the routing path that is part of an adjacent network. In examples, the source node may identify the first node in the adjacent network based on an address prefix for an address of the first node. In examples, the first node in the adjacent network is referred to as a bridge node. Although other nodes may additionally, or alternatively, be referred to as bridge nodes, such as any node that is configured to communicate with a node in another network. The source node may then generate source routing data that includes short addresses for nodes along the routing path that are in the same network as the source node and includes a long address for the first node along the routing path that is part of the adjacent network. The source routing data may also include a long address for the destination node, since the destination node is in a different network than the source node. The source node may then send the data with the source routing data along the routing path to reach the first node in the adjacent network.

When the data reaches the first node in the adjacent network, the first node may perform a similar process as discussed above with respect to the source node. For instance, the first node in the adjacent network may determine a routing path for sending the data from the first node to the destination node. If the first node in the adjacent network is located in the same network as the destination node, then the first node may send the data to nodes along the routing path using a short address format in source routing data. For example, the first node in the adjacent network may send the data with new source routing data that includes short addresses for nodes along the routing path. However, if the first node in the adjacent network is located within a different network than the destination node, the first node may send the data with new source routing data including both short addresses and long addresses. For example, the first node in the adjacent network may send the data with new source routing data that includes short addresses for nodes along the routing path that are within the same network as the first node and includes a long address for a first node along the routing path that is part of a next adjacent network. This process may be repeated any number of times until the data reaches the destination node. As such, the data may traverse any number of networks through any number of bridge nodes.

In examples, an address of a short address format (also referred to as a "short address") may include less bits or bytes than an address of a long address format (also referred to as a "long address"). For instance, a short address may include 2-byte address, while a long address may include a 16-byte address, such as a full Internet Protocol version 6 (IPv6) address.

Although many techniques are discussed as being performed by a first node in an adjacent network, in some examples other nodes may implement such techniques. For example, a last node along a routing path before an adjacent network may perform such techniques. Additionally, or alternatively, other nodes may implement such techniques, such as any node along a routing path.

As used herein, a node may comprise a source node, an intermediate node, a destination node, a bridge node, or another type of node within a network. Additionally, or alternatively, any of such nodes may perform the capabilities of another type of node. For example, a source node may, in some cases, be configured as a bridge node, a destination node, or another type of node. In examples, any node may be temporarily (or permanently) configured as a bridge node to communicate with a node in an adjacent network.

In examples, the techniques may be implemented in the context of a mesh network. Additionally, or alternatively, the techniques may be implemented in the context of a hierarchical tree-like network (e.g., Routing Protocol for Low Power and Lossy Networks (RPL)). For instance, the techniques may be implemented with nodes configured in a Destination Oriented Directed Acyclic Graph (DODAG) with parent nodes, child nodes, and a root node. Here, each node may be connected wirelessly and/or wired to a parent node and/or child node. Each node may be associated with a hierarchical level, with a root node being associated with the highest level. As communications are sent upward in the network (i.e., uplink—from child-to-parent), the communications travel closer to the root node. Meanwhile, as communications are sent downward in the network (i.e., downlink—from parent-to-child), the communications travel farther from the root node. However, the techniques may be applied to other types of networks.

Further, in examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communication network, control network, and/or another type of network or system. In one example, the techniques may be implemented in the context of the Internet of Things (IoT).

Example Environment

Figure 1:
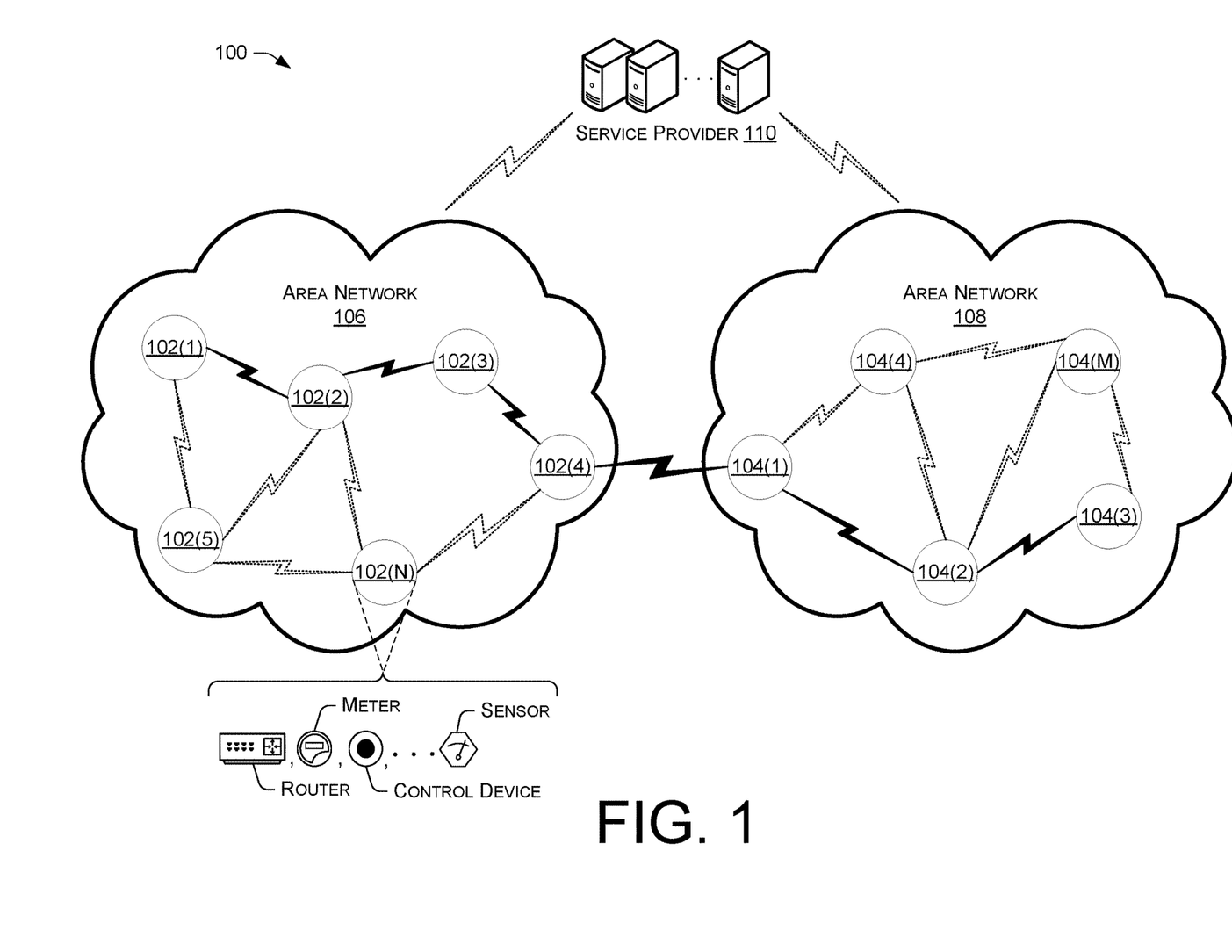
FIG. 1 is a schematic diagram of an example architecture in which the techniques discussed herein may be implemented.

FIG. 1 is a schematic diagram of an example architecture 100 in which the techniques may be implemented. The architecture 100 includes network communication devices or nodes 102(1)-102(N) (collectively nodes 102) and network communication devices or nodes 104(1)-104(M) (collectively nodes 104), where N and M represent any integer greater than or equal to one. As shown, nodes 102(1)-102(N) are associated with area network 106, and nodes 104(1)-104(M) are associated with area network 108. In examples, the nodes 102 of the area network 106 may communicate with the nodes 104 of the area network 108. Additionally, the nodes 102 and 104 may communicate with a service provider, such as service provider 110.

The nodes 102 and 104 may comprise one or more routers, meters, control devices, sensors, or any other computing devices with routing capabilities, such as discussed below in reference to FIG. 2. For instance, the nodes 102 and/or 104 may be metering nodes associated with collecting consumption data for commercial utilities, such as water, gas, and/or electricity consumption. In other instances, the nodes 102 and/or 104 may comprise a collection of the above listed devices. In yet other instances, the nodes 102 and/or 104 may be other types of devices.

The nodes 102 and/or 104 may perform different routing functions based on which node may be sending and/or requesting data at a given time. For example, if the node 102(1) is sending data to the node 104(3) in the area network 108, then the node 102(1) may be considered a source node, the node 104(3) may be considered the destination node, the node 104(1) and/or node 102(4) may be considered the bridge node, and the nodes 102(2), 102(3), 102(4), 104(1), and 104(2) may be considered intermediate nodes (assuming that the data is sent along such routing path). However, any of the nodes 102 in the area network 106 and/or any of the nodes 104 in the area network 108 may, at any given time, be considered a source node, a destination node, a bridge node, and/or an intermediate node depending on their prescribed source routing functionality for any given communication.

As used herein, the term "area network" may refer to a defined group of devices that are in communication with one another via one or more wired or wireless links. Examples of ANs include, for example, Local Area Networks (LANs), Wide Area Networks (WANs), Neighborhood Area Networks (NANs), Personal Area Networks (PANs), Home Area Networks (HANs), Field Area Networks (FANs), and so on. In some instances, multiple ANs exist and collectively define a larger network, such as an advanced metering infrastructure (AMI) of a utility communication network. In examples, a network communication device is a member of a particular AN. Although in some instances, a network communication device may be a member of multiple ANs. Further, over time, network communication devices may migrate from one AN to another geographically proximate or overlapping AN based on a variety of factors, such as respective loads on the ANs, battery reserves, interference, or the like.

The term "link" may refer to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The plurality of channels may include a data channel(s) and/or a control channel(s) that is designated for communicating messages to specify the data channel(s) to be utilized to transfer data. Transmissions on a control channel may be shorter relative to transmissions on a data channel. An AN may implement a channel hopping sequence, such that a channel may change over time.

The service provider 110 may provide remote resources to the nodes 102 and/or 104. In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The nodes 102 and/or 104 may register or interact with some or all of these one or more central office systems. In one example, the one or more central office systems may implement a meter data management system to collect resource consumption data (e.g., data regarding usage of water, gas, electricity, etc. at a meter) from the nodes 102 and/or 104, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data. In some instances, the service provider 110 may be referred to as a central agent.

The service provider 110 may be physically located in a single central location or may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

The service provider 110 may be implemented as one or more computing devices including servers, desktop computers, or the like. In one example, the service provider 106 is configured in a server cluster, server farm, data center, mainframe, cloud computing environment, or a combination thereof. To illustrate, the service provider 110 may operate as a cloud computing device that provides cloud services, such as storage, processing, and so on.

Additionally, or alternatively, the service provider 110 may serve as a supervisory control and data acquisition (SCADA) center associated with collecting and monitoring data associated with the nodes 102 and 104. For instance, the nodes 102 and 104 may provide the service provider 110 with metering data associated with one or more commercial utilities, such as gas, water, or electrical metering data.

The nodes 102, the nodes 104, and/or the service provider 110 may transmit and/or receive Protocol Data Units (PDUs). A PDU may comprise a bit, frame, packet, segment, or another unit of data. A PDU may include control data (e.g., headers, footer, etc.) and/or payload data. As used herein, a message, transmission, communication, or the like may refer to any type of PDU.

Although the techniques are described in many instances with the area networks being implemented as mesh networks, in some instances the area networks may be implemented in different network structures. For example, an area network may be implemented in whole or part by other types of networks, such as hub-and-spoke networks, mobile networks, cellular networks, etc. In some examples, the area networks may be implemented in the context of tree-like structures having parent and child nodes, such as DODAGs. Regardless of the topology of an area network, individual nodes may communicate by wireless (e.g., radio frequency) and/or wired (e.g., power line communication, Ethernet, serial, etc.) connections.

In examples, the techniques may be implemented in the context of sending data to one or more nodes located in one or more networks, such as sending Peer-to-Peer (P2P) data across one or more networks. In one illustration, a first node is part of a first PAN and a second node is part of a second PAN. Nodes of the first PAN may generally be configured to communicate within the first PAN, while nodes of the second PAN may generally be configured to communicate within the second PAN. Here, the techniques may be implemented to enable the first node to communicate with the second node.

Example Network Communications Devices

Figure 2:
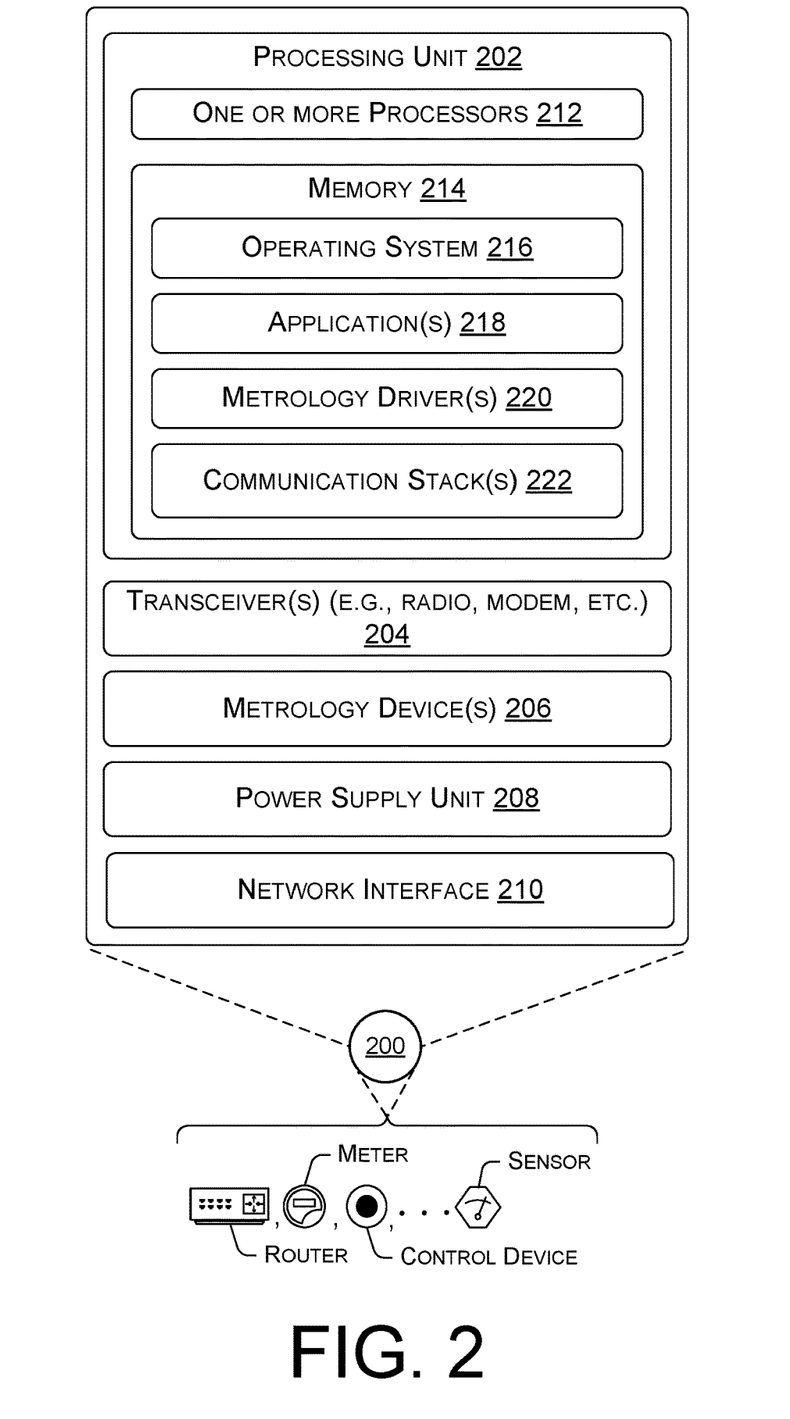
FIG. 2 is a diagram illustrating example details of a node.

FIG. 2 is a diagram illustrating example details of a node 200, such as any of the nodes 102 and/or 104 of FIG. 1. As discussed above, nodes may take numerous different forms, depending on the industry and context in which they are deployed. Different types of nodes may have different physical and/or logical components, and FIG. 2 should not be read as to limit the scope of such nodes.

The node 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on. In some examples, the node 200 is implemented as an edge device, such as a FAR, a cellular relay, a cellular router, an edge router, a DODAG (Destination Oriented Directed Acyclic Graph) root, a root device, and so on.

In some instances, the node 200 comprises a Limited Function Device (LFD), while in other instances the node 200 comprises a Full Function Device (FFD). An FFD may include more functionality/resources than an LFD, such as different processing powers, processing capabilities, power reliance, etc. In one example, an FFD is implemented as a Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life.

While FFDs and LFDs may have the similar components, the components may differ due to the different constraints. As one example, while both an FFD and an LFD have transceivers, the specific transceivers used may be different. For instance, a transceiver on an FFD may include a PLC modem, while a transceiver on an LFD does not because it is not connected to an electrical power line that could be used for PLC communications. Additionally, or alternatively, a transceiver on an LFD may employ a lower power RF radio than and FFD to minimize energy consumption. Further, other components of the FFDs and LFDs may vary. In some instances, an LFD is implemented with less functionality and/or include less hardware components than an FFD. Further, in some instances components of an LFD are lower power components than the corresponding components of an FFD.

In one example of the architecture 100 of FIG. 1, the nodes 102(1) and 104(1) each comprise an FFD, and the nodes 102(2)-102(N) and the nodes 104(2)-(M) each comprise an LFD. In another example, the nodes 102(1) and 104(1) each comprise an LFD, and the nodes 102(2)-102(N) and the nodes 104(2)-(M) comprise one or more LFDs and/or FFDs.

As shown in FIG. 2, the example node 200 includes a processing unit 202, a transceiver 204 (e.g., radio, modem, etc.), one or more metrology devices 206, a power supply unit 208, and a network interface 210. The processing unit 202 may include one or more processors 212 and memory 214. The one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in an area network or another network. The transceiver 204 may additionally or alternatively include a modem to provide power line communication (PLC) with other network communication devices that are connected to an electrical service grid. Additionally, or alternatively, the transceiver 204 may comprise a small form-factor pluggable (SFP) transceiver to enable multi-mode and/or single-mode fiber ethernet communication.

The metrology device(s) 206 may comprise the physical hardware and sensors to measure consumption data of a resource (e.g., electricity, water, or gas) at a site of the meter.

In the case of an electric meter, for example, the metrology device(s) 206 may include one or more Hall effect sensors, shunts, analog to digital (ADC) converters, or the like. In the case of water and gas meters, the metrology device(s) 206 may comprise various flow meters, pressure sensors, or the like. The metrology device(s) 206 may report the consumption data to a service provider via the transceiver 204 and/or the network interface 210. The consumption data may be formatted and/or packetized in a manner or protocol for transmission.

The power supply unit 208 may provide power to the node 200. In some instances, such as when the node 200 is implemented as a FFD, the power supply unit 208 comprises a mains power connector that couples to an Alternating Current (AC) or Direct Current (DC) mains power line where the node 200 is installed. In other instances, such as when the node 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 214 includes an operating system (OS) 216 and one or more applications 218 that are executable by the one or more processors 212. The memory 214 may also include one or more metrology drivers 220 configured to receive, interpret, and/or otherwise process metrology data collected by the metrology device(s) 206. Additionally, or alternatively, the one or more applications 218 may be configured to receive and/or act on data collected by the metrology device(s) 206.

The memory 214 may also include one or more communication stacks 222. In some examples, the communication stack(s) 222 may be configured to implement a 6LowPAN protocol, an 802.15.4e (TDMA CSM/CA) protocol, an 802.15.4-2015 protocol, and/or another protocol. However, in other examples, other protocols may be used, depending on the networks with which the node 200 is intended to be compatible. The communication stack(s) 222 describe the functionality and rules governing how the node 200 interacts with each of the specified types of networks. For instance, the communication stack(s) 222 may cause network communication devices to operate in ways that minimize the battery consumption of the network communication devices when they are connected to these types of networks.

In some instances, the node 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The various memories described herein (e.g., the memory 214) are examples of computer-readable media. Computer-readable media may take the form of volatile memory, such as random-access memory (RAM) and/or non-volatile memory, such as read-only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain nodes (e.g., the node 200) are described herein, it should be understood that those nodes may include other components and/or be arranged differently. As noted above, in some instances a node may include one or more processors and memory storing processor executable instructions to implement the functionalities they are described as performing. Certain nodes may additionally or alternatively include one or more hardware components (e.g., application specific integrated circuits, field programmable gate arrays, systems on a chip, and the like) to implement some or all of the functionalities they are described as performing.

By way of example and not limitation, the node 200 may implement a variety of modulation techniques and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a medium access control (MAC) sub-layer of a device may be able to indicate to a physical layer the modulation technique and data rate to be used for each transmission.

Example Partial Source Routing

Figure 3:
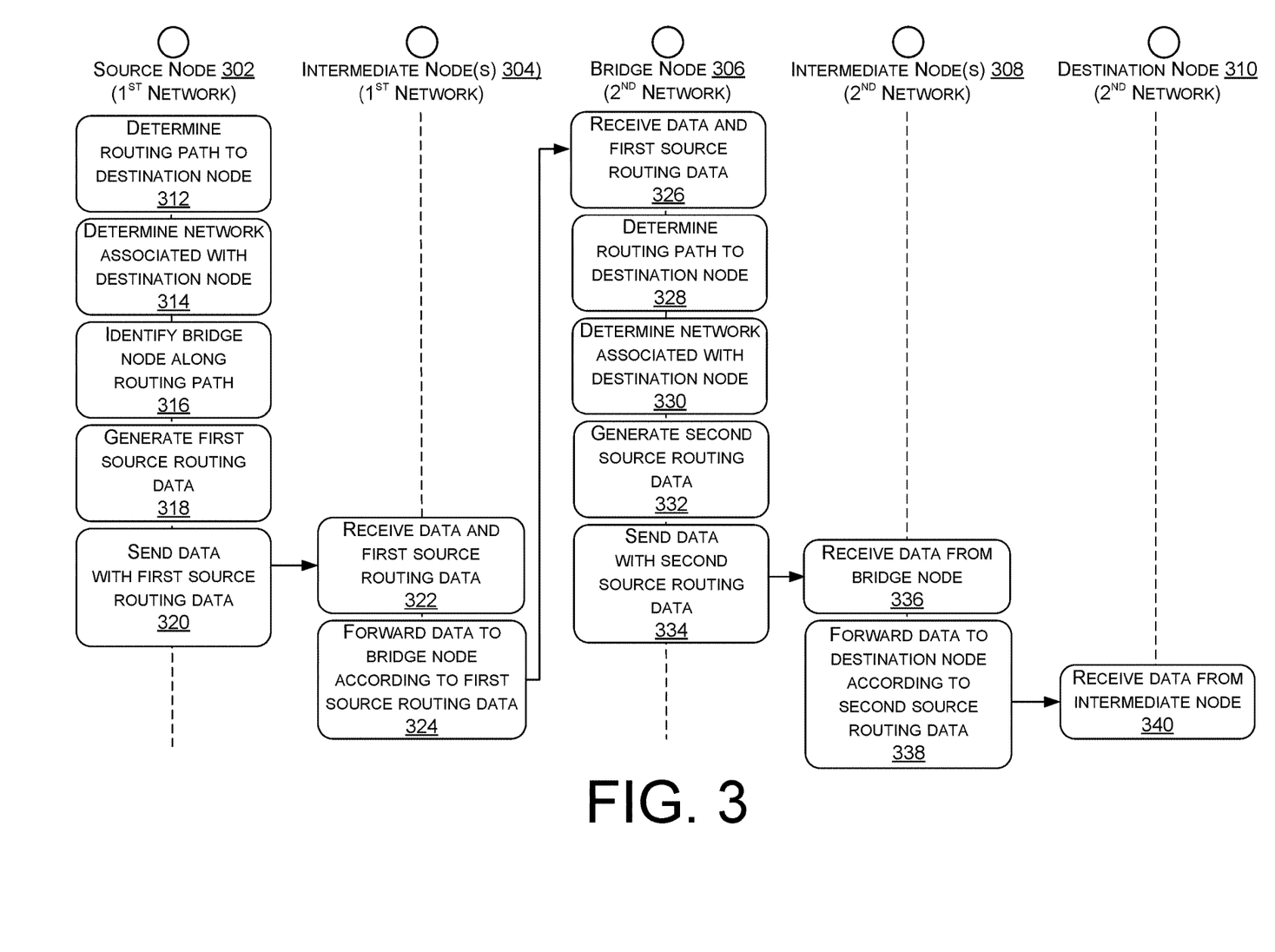
FIG. 3 is a signal flow diagram illustrating example partial source routing techniques.

FIG. 3 is a signal flow diagram illustrating an example partial source routing technique. For ease of illustration, FIG. 3 is an example implementation of cross-network source routing data across two networks, such as routing peer-to-peer (P2P) data. However, the techniques described herein may be implemented to route any kind of data across any number of networks. For instance, the techniques may be used when routing various data from a source node in a first network to a destination node in an Nth network, where N is any integer greater than or equal to one. Additionally, the nodes described in FIG. 3 as performing various functions are merely examples and should not limit the disclosure. For instance, there may be an N number of nodes associated with routing a single data message, where N is any integer greater than or equal to 1. Additionally, any of the nodes described in FIG. 3 may perform any of the operations described in FIG. 3. Furthermore, the order of the operations described in FIG. 3 should not be read as the only order in which the operations may be performed. For instance, some operations may be performed in parallel with other operations, and/or may be performed before and/or after other operations. As illustrated, nodes 302-310 may perform various operations, as discussed below.

At 312, a first node acting as the source node 302 may determine a routing path associated with sending data to a second node acting as the destination node 310. The routing path may be determined in a variety of ways. For example, the source node 302 may determine a shortest routing path between the source node 302 and the destination node 310 (e.g., least number of hops), a most reliable routing path (e.g., satisfies a reliability threshold, a path from among multiple paths that has historically transferred data with the highest success rates (least retransmissions), etc.), a quickest routing path (e.g., includes nodes that are capable of transmitting/receiving at more than a particular data rate, a path from among multiple paths that is associated with reaching the destination node 310 in the least amount of time, etc.), and so on. In examples, the source node 302 may use an algorithm to identify the routing path, such as the Dijkstra shortest path algorithm, Open Shortest Path (OSPF) algorithm, Floyd-Warshall algorithm, etc. In examples, each node sends a route advertisement message to a root node of a network to which the node belongs and also to each root node of each adjacent network that the node has discovered. Route advertisement messages may be forwarded by intermediate nodes along a path to a destination root. Intermediate nodes that have direct connection to an adjacent network may also duplicate received route advertisement messages to send it to root nodes in adjacent networks. In such a way, root nodes and intermediate nodes may store route information of all received nodes and be able to use such information to determine routing paths to any destination.

In the example of FIG. 3, the routing path includes all nodes from the source node 302 to the destination node 310. For instance, the source node 302 may identify a list of addresses for the one or more intermediate nodes 304, the bridge node 306, the one or more intermediate nodes 308, and the destination node 310. Although in other examples, the routing path may include some of the nodes from the source node 302 to the destination node 310, such as a list of addresses for the one or more intermediate nodes 304, the bridge node 306, and the destination node 310.

At 314, the source node 302 may determine a network associated with the destination node 310. In examples, the source node 302 may determine the network associated with the destination node 310 based on an address prefix for an address identifying the destination node 310. For instance, in the example of FIG. 3, the source node 302 may determine that the address prefix of the address for the destination node 310 corresponds to the second network and, as such, is different than the address prefix of an address for the source node 302, which corresponds to the first network.

Accordingly, at 316, the source node 302 may then identify the bridge node 306 located in the second network. Similar to determining the network of the destination node 310, the source node 302 may determine which node to use as the bridge node 306 based on an address prefix for an address identifying the bridge node 306. For instance, the list of addresses identifying the nodes along the routing path may be in an order corresponding to a direction of sending the data from the source node 302 to the destination node 310. The source node 302 may identify, as the bridge node 306, a first address in the list that does not share the same address prefix as the source node 302. In other instances, the bridge node 306 may be identified in other manners, such as by using a routing table, a probe message, etc. Accordingly, the bridge node 306 may be a node that is located in the second network and is located along the routing path adjacent to a node located in the first network. The bridge node 306 may be within communication range to a node in the first, adjacent network (e.g., a neighboring network). Although the bridge node 306 is referred to as a bridge, other nodes may additionally, or alternatively, be referred to as a bridge, such as a node in the first network that is able to communicate with a node in the second network (e.g., the bridge node 306).

At 318, the source node 302 may generate first source routing data for sending the data to the bridge node 310. In examples, the first source routing data may contain one or more short addresses identifying the one or more intermediate nodes 304 along the routing path that are associated with the first network. Additionally, the first source routing data may contain a long address identifying the bridge node 306 and/or a long address identifying the destination node 310.

A long address may include more bits or bytes than a short address. For example, a long address may be a 16-byte address, while a short address may be a 2-byte address. Although described as 2-byte and 16-byte addresses, the addresses may be formatted differently, such as 6-byte, 8-byte, 10-byte, and so on addresses. As such, the first source routing data may be referred to as partial source routing data, since the first source routing data identifies how to route the data to the bridge node 306, which may then generate additional source routing data identifying how to route the data the rest of the way to the destination node 310, as discussed below.

At 320, the source node 302 may then send the data with the first source routing data. For instance, the source node 302 may send the data within the first source routing data to the one or more intermediate nodes 304. In examples, the first source routing data may be contained in a source routing header for a packet and the data may be included in a payload for the packet. In other examples, the first source routing data may be contained in a footer of the packet, the payload of the packet, or anywhere else.

At 322, the one or more intermediate nodes 304 located in the first network may receive the data with the first source routing data. For instance, the one or more intermediate nodes 304 may receive the data from the source node 302. The data and the first source routing data may traverse any number of the one or more intermediate nodes 304 according to the first source routing data identifying which nodes to send the data to.

After receiving the data with the first source routing data, at 324, the one or more intermediate nodes 304 may forward the data with the first source routing data to the bridge node 306 according to the first source routing data.

At 326, the bridge node 306 may receive the data and the first source routing data from the one or more intermediate nodes 304. In response, at 328, the bridge node 306 may determine a routing path for sending the data from the bridge node 306 to the destination node 310. The routing path may be part of the routing path determined at 312. In other words, the routing path determined at 328 may identify nodes from the bridge node 306 to the destination node 310. The bridge node 306 may determine the routing path in a similar fashion as the source node 302 determined the routing path at 312. As similarly noted above, in some examples, the bridge node 306 may use an algorithm to determine the routing path, such as the Dijkstra shortest path algorithm, OSPF algorithm, Floyd-Warshall algorithm, etc. In examples, in determining the routing path, the bridge node 306 may identify a list of addresses of nodes on the routing path (including identifying the address of the destination node 310 in the first source routing data). Here, the routing path may include the one or more intermediate nodes 308.

At 330, the bridge node 306 may determine a network associated with the destination node 310. In examples, this may include similar techniques as that discussed above at 314. For instance, the bridge node 306 may compare an address prefix for the address of the destination node 310 with an address prefix for the address of the bridge node 306.

At 332, the bridge node 306 may generate second source routing data. In this example, the bridge node 306 determines that the destination node 310 is in the same network as the bridge node 306. As such, the second source routing data may include one or more short addresses for the one or more intermediate nodes 308 and a short address for the destination node 310. However, in other examples, if the bridge node 306 determines that the destination node 310 is in a different network than the bridge node 306, then the second source routing data may include one or more short addresses for the one or more intermediate nodes 308, a long address for another bridge node in a next adjacent network, and a long address for the destination node 310.

At 334, the bridge node 306 may send the data with the second source routing data. In examples, the second source routing data may be contained in a source routing header for the P2P data packet. In examples, the second source routing data may be contained in a source routing header for a packet and the data may be included in a payload for the packet. In other examples, the second source routing data may be contained in a footer of the packet, the payload of the packet, or anywhere else.

At 336, the one or more intermediate nodes 308 located in the second network may receive the data with the second source routing data. For instance, the one or more intermediate nodes 308 may receive the data from the bridge node 306. The data and the second source routing data may traverse any number of the one or more intermediate nodes 308 according to the second source routing data identifying which nodes to send the data to.

After receiving the data with the second source routing data, at 338, the one or more intermediate nodes 308 may forward the data with the second source routing data to the destination node 310 according to the second source routing data.

At 340, the destination node 310 may receive the data from the one or more intermediate nodes 308.

Although this example is discussed in the context of having the one or more intermediate nodes 304 and the one or more intermediate nodes 308, in some examples such nodes may not be needed. For example, the source node 302 may be within communication range to the bridge node 306 (e.g., one hop away) and send the data directly to the bridge node 306. Additionally, or alternatively, the bridge node 306 may be within communication range to the destination node 310 (e.g., one hop away) and send the data directly to the destination node 310.

Example Processes

Figure 4:
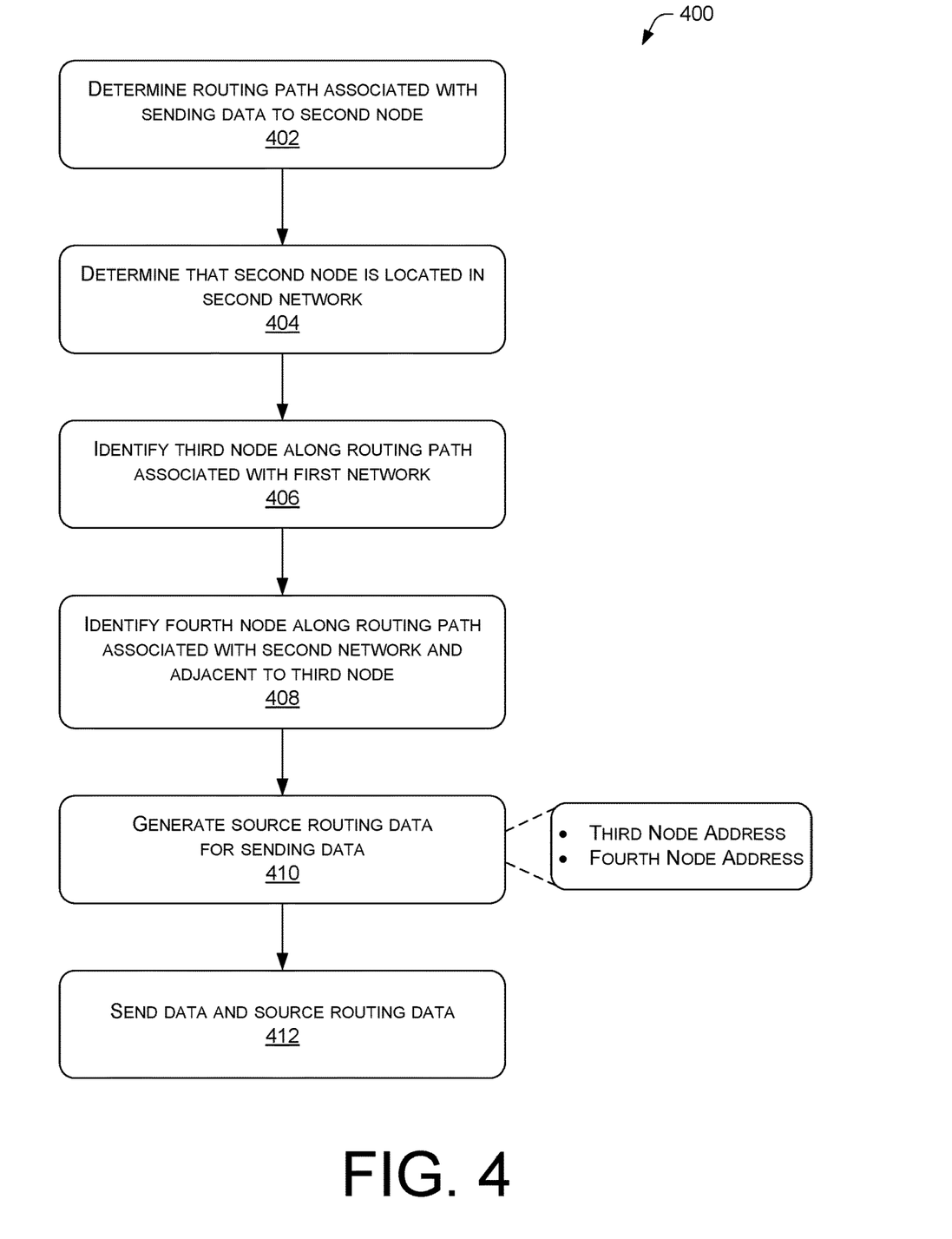
FIG. 4 is a flow diagram illustrating an example process of partial source routing that may be performed by a source node.
Figure 5:
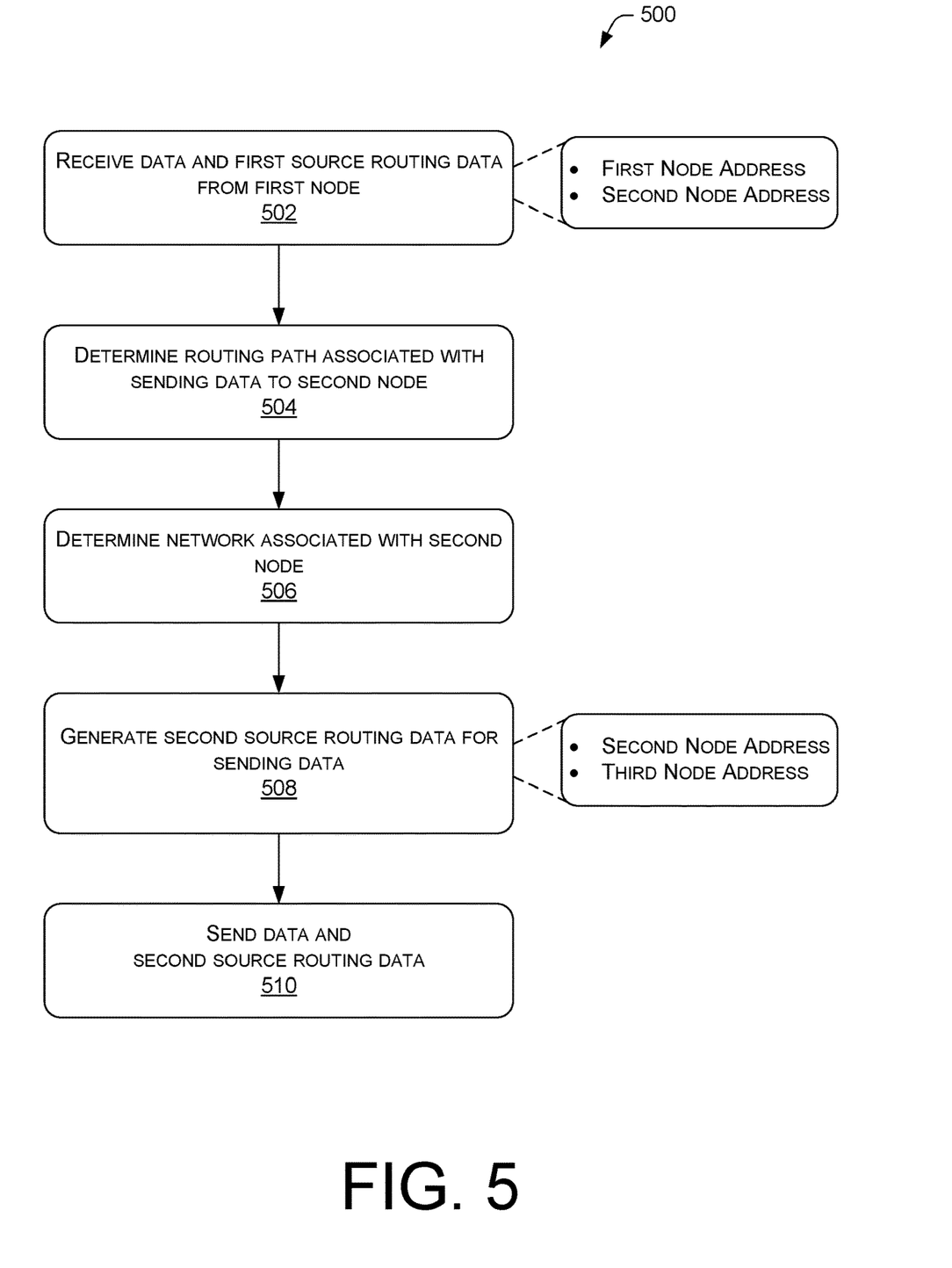
FIG. 5 is a flow diagram illustrating an example process of partial source routing that may be performed by a bridge node.

FIGS. 4 and 5 illustrate example processes 400 and 500 for partial source routing. For ease of illustration, the processes 400 and 500 may be described as being performed by a node or network communication device described herein, such as any of the nodes 102, the nodes 104, and/or the node 200. However, the processes 400 and 500 may be performed by other devices and/or nodes. Moreover, the network communication devices and/or nodes may be used to perform other processes.

The processes 400 and 500 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FP- GAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 4 is a logic flow diagram illustrating an example process 400 of partial source routing that may be performed by a source node. For example, the process 400 may be performed by the source node 102(1) of FIG. 1 to send data to the destination node 104(3), by the source node 302 of FIG. 3 to send data to the destination node 310, by the bridge node 306 of FIG. 3 (acting as a source node) to send data to the destination node 310, and so on.

At 402, a first node (e.g., a source node) may determine a routing path associated with sending data to a second node (e.g., a destination node). In examples, the first node may identify a list of addresses of nodes along the routing path between the first node and the second node. The first node may be located in a first network.

At 404, the first node may determine that the second node is located in a second network. The second network may be different than the first network in which the first node is located. For instance, based on the list of addresses (particularly the address of the second node), the first node may determine that an address prefix of an address of the second node corresponds to the second network and is different than an address prefix of an address of the first node, which corresponds to the first network. In other instances, other techniques may be used to determine that the second node is in a different network.

At 406, the first node may identify a third node along the routing path that is associated with the first network. In examples, the first node may identify that the third node is located in the first network based on an address prefix of an address for the third node. For instance, the list of addresses identifying the nodes along the routing path may be in an order corresponding to a direction of transit for sending the data from the first node to the second node. The first node may identify the third node based on the address of the third node being the last address on the list of nodes that shares the same address prefix as the first node. Accordingly, the third node may be located in the first network and disposed along the routing path adjacent to a node located in the second network, similar to node 102(4) in FIG. 1. Additionally, or alternatively, the first node may identify the third node based on other techniques.

At 408, the first node may identify a fourth node along the routing path that is associated with the second network and disposed along the routing path directly adjacent to the third node. In examples, similar to the example described above in 406, the first node may identify the fourth node based on an address prefix of an address of the fourth node. For instance, the list of addresses identifying the nodes along the routing path may be in an order corresponding to the direction of transit for sending data from the first node to the second node. The first node may identify the fourth node based on the address of the fourth node being the first address on the list that does not share the same address prefix as the first node. In other words, the first node may identify the fourth node based on the address prefix of the fourth node being associated with the second network. Accordingly, the fourth node may be located in the second network and disposed along the routing path immediately-adjacent to a node located in the first network, similar to the node 104(1) in FIG. 1. Additionally, or alternatively, the first node may identify the fourth node based on other techniques.

At 410, the first node may generate source routing data for sending the data to the fourth node. The source routing data may include an address identifying the third node and an address identifying the fourth node. In examples, the two addresses may be in different address formats. For instance, the address identifying the third node may be of a 2-byte short address format, since the third node is located in the same network as the first node. Additionally, the address identifying the fourth node may be of a 16-byte long address format (e.g., full IPv6 address), since the fourth node is located in a different network (the second network) than the first node.

Additionally, or alternatively, the source routing data may include a short address for each intermediate node along the routing path that is associated with the same network as the first node (e.g., the first network). For instance, consider an example where the nodes 102(1), 102(4), and 104(1) of FIG. 1 are considered as the first, third, and fourth nodes, respectively. In this example, the source routing data may include a 2-byte short address for the nodes 102(2)-102(4), as well as a 16-byte long address for the node 104(1).

At 412, the first node may send the data and the source routing data (e.g., transmit the data and the source routing data). In examples, the source routing data may be included in a source routing header associated with source routing techniques for routing data. Additionally, or alternatively, the source routing data may be contained within payload, a footer, etc.

FIG. 5 is a flow diagram illustrating an example process 500 of partial source routing that may be performed by a bridge node. For example, the process 500 may be performed by the bridge node 104(1) of FIG. 1, by the bridge node 306 of FIG. 3, or any other node, such as the node 102(4) of FIG. 1 (acting as a bridge node).

At 502, the bridge node may receive data and first source routing data from a first node. In examples, the first node may be a source node. In other examples, the first node may be an intermediate node. The first source routing data may comprise one or more addresses. For instance, the first source routing data may comprise a first address identifying an intermediate node of a first network. The first address may be of a first address format that is a 2-byte short address format. Additionally, the source routing data may comprise a second address identifying the bridge node. In examples, the second address may be of a second address format, such as a 16-byte long address format. In examples, the first source routing data may include a list of 2-byte short addresses identifying each intermediate node along the routing path that was involved in routing the data from an original source node to the bridge node.

At 504, the bridge node may determine a routing path associated with sending the data to a second node. In examples, the second node may be a destination node. In other examples, the second node may be another bridge node that is located along the routing path. Additionally, the bridge node may identify a list of addresses of nodes along the routing path between the bridge node and the second node.

At 506, the bridge node may determine a network associated with the second node. For instance, the bridge node may determine that the second node is located in the same network as the bridge node. Alternatively, the bridge node may determine that the second node is located in a different network. The bridge node may determine the network of the second node based on the list of addresses described above in 504. For example, the bridge node may determine that an address prefix of an address of the second node is the same address prefix as that of an address of the bridge node (e.g., implying that both nodes are located in the same network). In a similar same way, the bridge node may determine that the second node is in a different network than the bridge node based on the address prefixes of the respective nodes not being the same. Additionally, or alternatively, the bridge node may determine the network associated with the second node in other manners.

At 508, the bridge node may generate second source routing data for sending the data. In examples where the second node is in the same network as the bridge node, the source routing data may include a 2-byte short address identifying the second node, for example. Additionally, or alternatively, the second source routing data may include a list of 2-byte short addresses for each intermediate node along the routing path that is located in the network where the bridge node is located. For instance, consider an example where the nodes 104(1), 104(2), and 104(3) of FIG. 1 are considered the bridge node, an intermediate node, and the second node, respectively. Here, the second source routing data may include two 2-byte short addresses for nodes 104(2) and 104(3).

In examples where the second node is in a different network than the bridge node, the second source routing data may include an address identifying a second bridge node in the next network. The address of the second bridge node may be in a long 16-byte format, since the second bridge node is located in a different network than the bridge node. Additionally, the second source routing data may include a list of 2-byte short addresses for each intermediate node along the routing path between the bridge node and the second bridge node.

At 510, the bridge node may send the data and the second source routing data (e.g., transmit the data and the second source routing data). In examples, the second source routing data may be included in a source routing header associated with source routing techniques for routing data. Additionally, or alternatively, the source routing data may be contained within payload, a footer, etc.

Example Data Structure

Figure 6:
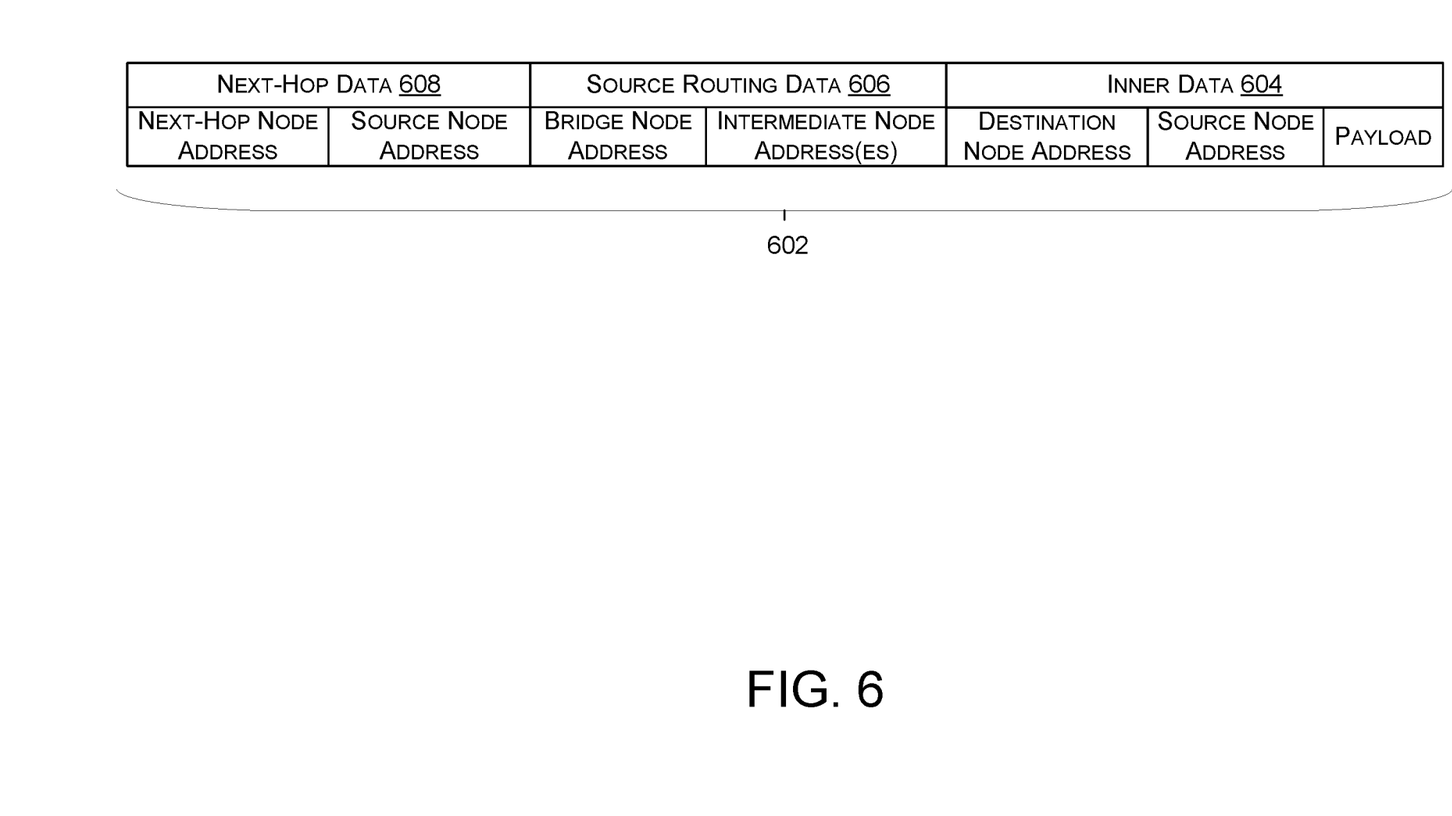
FIG. 6 is a diagram illustrating example details of a Protocol Data Unit (PDU) that may be used for partial source routing.

FIG. 6 is a diagram illustrating example details of a Protocol Data Unit (PDU) 602 that may be used for partial source routing.

As illustrated, the PDU 602 may include inner data 604. The inner data 604 may include a payload, a source node address of a source node that is sending the inner data 604, and a destination node address of a destination node that is sending the inner data 604. In examples, the destination node address and the source node address may each be a long address (e.g., 16-byte address). In examples, the payload of the inner data 604 (and/or the inner data 604) may be referred to as "data."

The PDU 602 may also include source routing data 606. The source routing data 606 may include a bridge node address for a bridge node and one or more intermediate addresses for one or more intermediate nodes along a routing path. In examples, the bridge node address may be a long address (e.g., 16-byte address), while the one or more intermediate node addresses may each be a short address (e.g., 2-byte address). In examples, the source routing data 606 may be a source routing header.

The PDU 602 may also include next-hop data 608 including a next-hop address of a next-hop node and the source node address of the node that is sending the PDU 602. The source node address of the next-hop data 608 may be the same as the source node address of the inner data 604. In examples, the next-hop data 608 may be an outer header (e.g., outer IP header).

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A first node comprising:
one or more processors; and
one or more computer-readable media storing instructions that, when executed, cause the one or more processors to perform acts comprising:
determining a routing path associated with sending data from the first node to a second node;
determining that the first node is part of a first network and that the second node is part of a second network;
identifying, based at least in part on determining that the second node is part of the second network, a third node that is part of the first network and a fourth node that is part of the second network, wherein the third node and the fourth node are disposed along the routing path between the first node and the second node;
generating source routing data for sending the data, the source routing data comprising:
a first address identifying the third node, the first address being of a first address format, wherein the first address being of the first address format is based at least in part on the first node and the third node being part of the first network; and
a second address identifying the fourth node, the second address being of a second address format that comprises a larger address space than the first address format, wherein the second address being of the second address format is based at least in part on the fourth node being part of the second network;
sending, from the first node and to the third node, the data with the source routing data.

2. The first node of claim 1, wherein:
the second address identifying the fourth node comprises an address prefix associated with the second network; and
identifying the fourth node along the routing path that is part of the second network comprises determining that the address prefix is associated with the second network.

3. The first node of claim 1, wherein at least one of the third node or the fourth node is configured as a bridge between the first network and the second network.

4. The first node of claim 3, wherein the third node is disposed along the routing path adjacent to the fourth node.

5. The first node of claim 1, wherein the source routing data includes a source routing header.

6. The first node of claim 1, wherein the first address format comprises a 2-byte address and the second address format comprises a 16-byte address.

7. The first node of claim 6, wherein the second address format comprises an Internet Protocol version 6 (IPv6) address.

8. A bridge node comprising:
one or more processors; and
one or more computer-readable media storing computer-executable instructions that, when executed, cause the one or more processors to perform acts comprising:
receiving, from a first node associated with a first network, data and first source routing data for the data, the first source routing data comprising:
a first address identifying the first node, the first address being of a first address format, wherein the first address format corresponds with the first node being associated with the first network; and
a second address identifying the bridge node, the second address being of a second address format that is longer than the first address format, wherein the second address format corresponds with the bridge node being associated with a second network;
determining a routing path associated with sending the data to a second node;
determining that the second node is associated with the second network;
generating, based at least in part on determining that the second node is associated with the second network, second source routing data comprising a third address that identifies the second node, the third address being of the first address format based at least in part on the second node being associated with the second network; and
sending the data with the second source routing data.

9. The bridge node of claim 8, wherein determining that the second node is associated with the second network is based at least in part on an address prefix associated with the second node.

10. The bridge node of claim 8, wherein the instructions further cause the one or more processors to perform acts comprising:
determining a third node along the routing path that is associated with the second network;
wherein the second source routing data further comprises a fourth address that identifies the third node associated with the second network, the fourth address being of the first address format.

11. The bridge node of claim 8, wherein the first address format comprises a 2-byte address and the second address format comprises a 16-byte address.

12. The bridge node of claim 8, wherein the source routing data comprises a source routing header.

13. A method comprising:
determining, by a first node that is part of a first network, a routing path associated with sending data from the first node to a second node;
determining, by the first node, that the second node is part of a second network;
identifying, based at least in part on determining that the second node is part of the second network, a third node along the routing path that is part of the first network;
identifying, based at least in part on determining that the second node is part of the second network, a fourth node along the routing path that is part of the second network; and
sending, based at least in part on identifying the third node and the fourth node, the data and source routing data for the data, the source routing data comprising:
a first address corresponding with the third node, the first address being of a first address format, wherein the first address format is associated with the first network; and
a second address corresponding with the fourth node, the second address being of a second address format that is longer than the first address format, wherein the second address format is associated with the second network.

14. The method of claim 13, further comprising:
prior to sending the data, generating the source routing data for sending the data, the source routing data comprising a source routing header.

15. The method of claim 13, wherein the second address format includes more bits or bytes than the first address format.

16. The method of claim 13, wherein:
the second address comprises an address prefix associated with the second network; and
identifying the fourth node along the routing path that is part of the second network is based at least in part on the second address comprising the address prefix.

17. The method of claim 13, wherein at least one of the third node or the fourth node is configured as a bridge between the first network and the second network.

18. The method of claim 13, wherein:
the third node is disposed along the routing path adjacent to the fourth node; and
at least one of the third node or the fourth node is configured as a bridge between the first network and the second network.

19. The method of claim 15, wherein the first address format comprises a 2-byte address and the second address format comprises a 16-byte address.

20. The method of claim 13, wherein the second address format comprises an Internet Protocol version 6 (IPv6) address.

* * * * *